Feb. 21, 1933.  P. L. M. VAN DER LANDE  1,898,156
CONTROLLED PLURAL BATCH WEIGHING MACHINE
Filed July 16, 1932
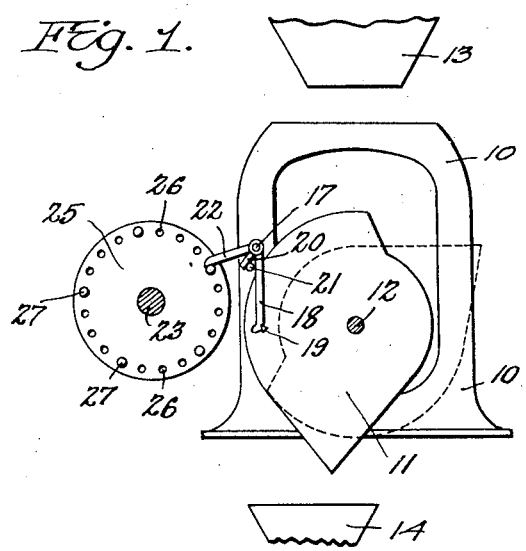
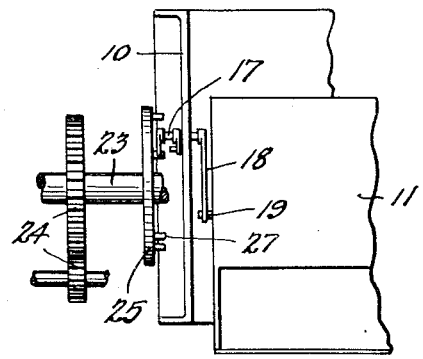
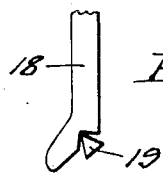
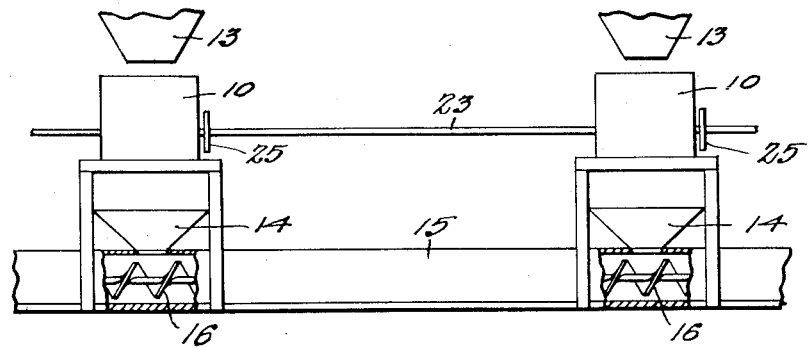
INVENTOR.
P. L. M. VAN DER LANDE
BY
ATTORNEYS.

Patented Feb. 21, 1933

1,898,156

UNITED STATES PATENT OFFICE

PETRUS L. M. VAN DER LANDE, OF DEVENTER, NETHERLANDS

CONTROLLED PLURAL BATCH WEIGHING MACHINE

Application filed July 16, 1932, Serial No. 622,939, and in the Netherlands July 24, 1931.

This invention relates to the handling of material and has special reference to material weighing and delivering means.

More particularly the invention relates to the timed delivery of weighed quantities or batches of material from one or more sources of supply.

In flour and similar mills, for example, weighed quantities of different grades or kinds of grain must be taken from several storage bins, each containing a specific grade or kind. The quantity of one grade or kind of grain may differ from that of another or from all the others, the several quantities used being dependent on the particular blend desirable in the flour to be produced. In all cases it is essential for the best results that the adopted proportions be kept uniform and for this reason it is necessary that the proportioning be by weight, since volumetric measurements of many substances lead to wide variations in the composition of the final blend or mixture.

Furthermore, in many processes it is highly desirable that the delivery of weighed material shall occur at regularly or definitely spaced time intervals.

One important object of the present invention is to provide a novel construction of apparatus for alternately stopping and starting the actuation of an automatic batch dumping weighing machine, such as for example the type of machine shown in the patent to M. E. Reisert of October 9, 1896, numbered 483,636.

A second important object of the invention is to provide a novel construction of apparatus of this class so arranged that it may be adjusted to effect such starting and stopping any desired number of times in a given time interval.

A third important object of the invention is to provide a novel construction of such apparatus whereby a plurality of such weighing machines may be started and stopped in definite timed relation to each other. For instance, if two weighing machines, one may be caused to operate a certain number of times in each hour, while the other operates a certain other number of times per hour.

With the above and other objects in view, as will be presently understood, the invention consists in general of certain novel details of construction and combination of elements hereinafter fully described, illustrated in the accompanying drawing and specifically claimed.

In the accompanying drawing like characters of reference indicate like parts in the several views, and:—

Figure 1 is a diagrammatic side elevation of a portion of the standard weighing machine above mentioned, the view showing the novel controlling mechanism applied to the machine.

Figure 2 is a similar view of such a weighing machine and controlling device, but taken at right angles to Figure 1.

Figure 3 is a front elevation of a weighing and mixing apparatus embodying a plurality of weighing machines and the controlling means therefor.

Figure 4 is an enlarged detail view of part of a certain latch used herewith.

In the embodiments of the invention as here illustrated the weighing machine itself may be of any preferred construction, and for this reason and the further reason that no claim is made to the construction of the weighing machine itself, this machine has been merely shown in diagrammatic outline with many of the parts omitted. In the several views the weighing machine frame is indicated at 10 and the machine is provided with a weigh chamber or receptacle 11 provided with suitable trunnions 12 on which it oscillates between the dumping position shown in full lines in Figure 1, and the filling position shown in dotted lines in said figure. Above the frame 10 is shown the lower part or mouth of a storage bin 13 from which the grain flows to fill the weigh chamber or receptacle 11. In Figures 1 and 3, each weigh receptacle is shown as delivering to a hopper 14, which in Figure 3 is shown opening into the casing or trough 15 of a screw conveyor 16. In such apparatus as this the weigh receptacle, when in the dotted line or filling position operates to receive material from the line 13. When the weight of material for which the machine is set has flowed into the receptacle 11, further flow is cut off and the receptacle tilts to full line or discharge position and dumps the weighed material. As usual in such machines the empty receptacle returns at once to filling position so that the filling and dumping take place alternately and in a continuous succession of such alternate movements. In such machines the time interval between the delivery of any two charges is just sufficient for the accomplishment of one complete cycle of operations and there is no regulation of time between successive dumpings of the receptacle 11.

In the present invention there is provided a rock shaft 17 whereon is fixed a rock arm 18 movable into and out of the path of a latch lug 19 fixed on the side of the receptacle 11, the arm 18 having a notch in its end, as shown in Figure 4, to receive this lug. A stop arm 20 is also fixed on the shaft 17 and at 21 is a stop carried by the frame 10 to limit movement of the stop arm, and consequently of the arm 18, in one direction. A third arm 22 is fixed on the shaft 17 and constitutes a trip arm.

Extending along in front of the machine or machines is an operating shaft 23, which is driven by any suitable means here indicated by gearing 24. Obviously this shaft may be driven at any desired speed. At each weighing machine a disk 25 is fixedly mounted on the shaft and is positioned so that the trip arm 22 lies close to one side of the disk at its peripheral portion. Each disk has a series of spaced pin holes 26 formed adjacent its periphery and pins 27 are fitted in selected holes.

With this mechanism used in connection with the weighing machine, each time the receptacle 11 dumps and starts to swing back to filling position the lug 19 engages in the notch of the arm 18 and the receptacle is prevented from swinging back until a pin 27 strikes the trip arm 22, whereupon the latch arm 18 is swung free of the lug 11, the receptacle takes its filling position, is filled and dumps.

By this means the receptacle may be caused to operate any desired number of times for each revolution of the shaft 23, and since this shaft may be made to revolve at any desired speed, as by suitably proportioned gearing, the receptacle may be caused to discharge uniformly weighed charges at regularly spaced time intervals. Where two or more weighing machines are controlled from a single shaft, as in Figure 3, the number and spacing of the pins on the several disks may be made such as to obtain the same or different numbers of dumpings of the several receptacles for each revolution of the shaft, as may be desired. Thus a mixture of any desired proportions by weights may be obtained.

There has thus been provided a simple and efficient device of the kind described and for the purpose specified.

It is obvious that changes may be made in the form and proportions of the device without departing from the material principles involved. It is not therefore desired to confine the invention to the exact form herein shown and described, but it is desired to include all such as come within the scope claimed.

What is claimed is:—

1. In a controlling mechanism for weighing machines having a weigh receptacle moving between filling and dumping positions, a latch means for latching the receptacle in dumping position, and a timing device operating to release the latch means at predetermined intervals.

2. In a controlling mechanism for weighing machines having a weigh receptacle moving between filling and dumping positions, a latch means for latching the receptacle in dumping position, and a timing device operating to release the latch means at predetermined intervals, said timing device including a latch tripping element and a support therefor on which the element is adjustably supported.

3. In a controlling mechanism for weighing machines having a weigh receptacle moving between filling and dumping positions, a latch means for latching the receptacle in dumping position, and a timing device operating to release the latch means at predetermined intervals, said timing device including a rotating wheel provided with an annular series of pin holes, and pins engageable in selected holes and adapted to actuate the latch means to release the same.

4. In a controlling mechanism for weighing machines having a weigh receptacle moving between filling and dumping positions, a latch lug on said receptacle, a latch arm supported adjacent the receptacle for movement into and out of the path of said lug, said arm engaging the lug upon the receptacle being dumped to hold it from return to filling position, and a timing device operating to move the latch arm out of the path of the lug at predetermined time intervals.

5. In a controlling mechanism for weighing machines having a weigh receptacle moving between filling and dumping positions, a latch lug on said receptacle, a latch arm supported adjacent the receptacle for moving into and out of the path of said lug, said arm engaging the lug upon the receptacle being dumped to hold it from return to filling position, and a timing device operating to move the latch arm out of the path of the lug at predetermined time intervals, a rotating shaft, a pin wheel fixed on said shaft and having a circular series of spaced pin holes concentric to its axis, a plurality of pins engageable in selected holes of said series, and a trip arm fixedly associated with the latch arm and extending into the path of said pins.

In testimony whereof I affix my signature.

PETRUS L. M. van der LANDE.